United States Patent [19]
Schnurer

[11] Patent Number: 4,744,435
[45] Date of Patent: May 17, 1988

[54] MOTOR VEHICLE HAVING ALL-WHEEL DRIVE

[75] Inventor: Otmar Schnurer, Gifhorn, Fed. Rep. of Germany

[73] Assignee: Volkswagen AG, Wolfsburg, Fed. Rep. of Germany

[21] Appl. No.: 24,826

[22] Filed: Mar. 12, 1987

[30] Foreign Application Priority Data

Mar. 25, 1986 [DE] Fed. Rep. of Germany ....... 3609977

[51] Int. Cl.$^4$ ............................................. B60K 23/08
[52] U.S. Cl. ..................................... 180/233; 180/247; 180/250
[58] Field of Search ............... 180/233, 247, 248, 249, 180/250

[56] References Cited

U.S. PATENT DOCUMENTS

| | | | |
|---|---|---|---|
| 4,132,297 | 1/1979 | Brown et al. | 180/248 |
| 4,562,897 | 1/1986 | Renneker | 180/233 |
| 4,605,087 | 8/1986 | Ashauer et al. | 180/248 |

FOREIGN PATENT DOCUMENTS 59-179425  10/1984  Japan .................... 180/248

*Primary Examiner*—John A. Pekar
*Attorney, Agent, or Firm*—Brumbaugh, Graves, Donohue & Raymond

[57] ABSTRACT

A motor vehicle having a front engine and all-wheel drive, wherein the wheels of the front axle are continuously driven, while the drive for the wheels of the rear axle is capable of being made either connectable or permanent via a lockable center differential or automatically by way of a viscous-coupling device arranged in the driveshaft line between the front axle and the rear axle. The coupling is arranged in such a way that the front and rear axles are coupled together essentially rigidly with regard to torque, there being provided in the train of the driveshaft line transmitting the torque between the front and rear wheels at least one free-wheeling mechanism with free-wheel lock. The free-wheeling mechanism is arranged so that—in the unlocked state—its free-wheel part coupled with the rear-axle drive is capable of overriding its free-wheel part coupled with the front axle drive, the free-wheeling mechanism being locked during drive operation and released upon actuation of the service brake.

12 Claims, 2 Drawing Sheets

MOTOR VEHICLE HAVING ALL-WHEEL DRIVE

BACKGROUND OF THE INVENTION

The invention relates to a motor vehicle having a front engine and all-wheel drive of the type wherein the wheels of the front axle are driven continuously, while the drive for the wheels of the rear axle is capable of being connected directly by way of a lockable center differential or automatically by means of a viscous coupling device arranged in the driveshaft line between the front axle and rear axle. Thus, the front and rear axles are essentially rigidly coupled together with regard to torque, and in the train of the driveshaft line transmitting the torque between the front and rear wheels there is provided at least one free-wheeling device with a free-wheel lock, preferably a grip roller free-wheeling device. The free-wheeling device is arranged and designed so that—in the unlocked state—its free-wheel part coupled with the rear-axle drive is capable, during forward driving, of overriding its free-wheel part coupled with the front-axle drive.

A motor vehicle of this type is disclosed in, for example, DE-OS No. 33 17 247. In this known vehicle, at least one free-wheeling device with a free-wheel lock, for example a grip roller free-wheeling means, is arranged in the train of the driveshaft line to transmit the torque between front and rear wheels. The free-wheeling device is designed so that a reduction of the rotational speed of the front wheels owing, for example, to actuation of the service brake, cannot be transmitted through the driveshaft line to the rear wheels. This ensures that the road stability of the vehicle is not impaired, even in the case of overbraking of the front wheels, due to the free-wheeling device which prevents a locking of the front wheels from having an effect on the rear wheels.

To make an all-wheel drive possible even in reverse, the free-wheeling device is equipped with a free-wheel lock which may be locked either manually or alternatively automatically, for example, upon shifting into reverse.

SUMMARY OF THE INVENTION

The object of the invention is to further improve the road characteristics of a motor vehicle of the type mentioned above.

Pursuant to this object, one aspect of the present invention resides in an all-wheel drive motor vehicle wherein the free-wheeling device is locked during a drive operation and released upon actuation of the service brake. In other words, pursuant to the invention, the free-wheeling device is arranged so that its free-wheel lock is continuously effective and is released automatically only upon actuation of the service brake.

In conventional motor vehicles having all-wheel drive, the free-wheeling device is continuously effective and is rendered ineffective only in reverse drive, either automatically or else manually by engagement of the free-wheel lock. In contrast, the free-wheeling device of the present invention is locked, during both forward and reverse operation, and provides free wheeling in the desired direction only upon actuation of the service brake.

The operation of the free-wheeling device with its free-wheel lock improves the already very good road characteristics per se of the vehicle, especially in cornering. Specifically, if during cornering the foot—for any reason whatsoever—is "taken off the gas," i.e., shear operation sets in, the all-wheel drive is maintained in full and the shearing forces are transmitted to both the front wheels and the rear wheels, with the result that the existing cornering ability of the vehicle is retained.

On the other hand, in reverse drive, upon actuation of the service brake, despite the resulting disconnection of the free-wheel lock, the braked front wheels remain rigidly coupled by way of the driveshaft line with the braked rear wheels even if the front wheels are braked more heavily than the rear wheels. Specifically, the free-wheeling device then locks automatically, so that any part of the braking force no longer capable of transmission by the front wheels per se is transmitted by the rear wheels which are rigidly coupled with them. Only when the rear wheels are overbraked (locked), does locking of the front wheels occur, which, however, is not a problem in reverse drive, where generally one drives only at low speeds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
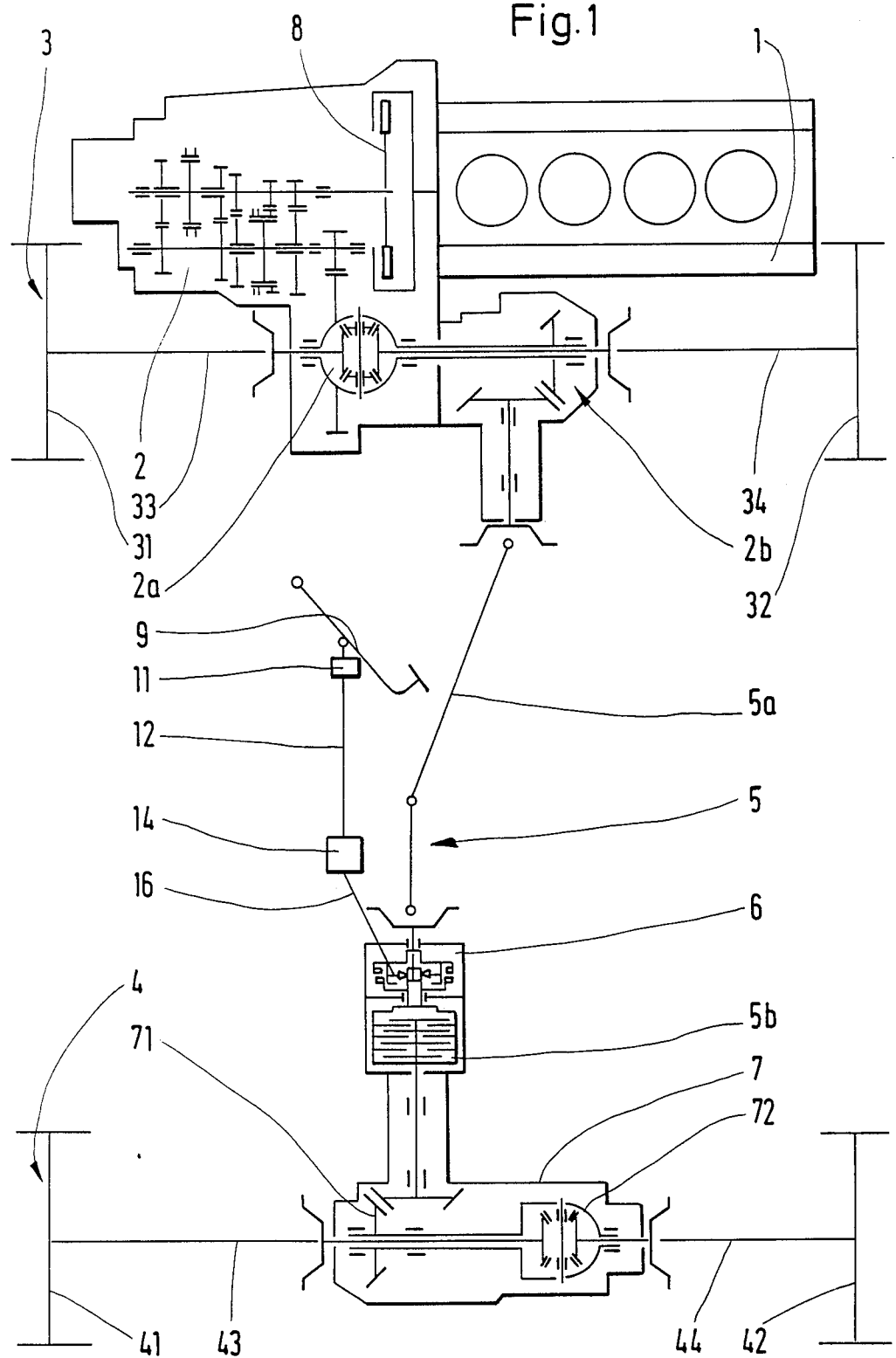
FIG. 1 schematically illustrates a first embodiment of the present invention.
Figure 2:
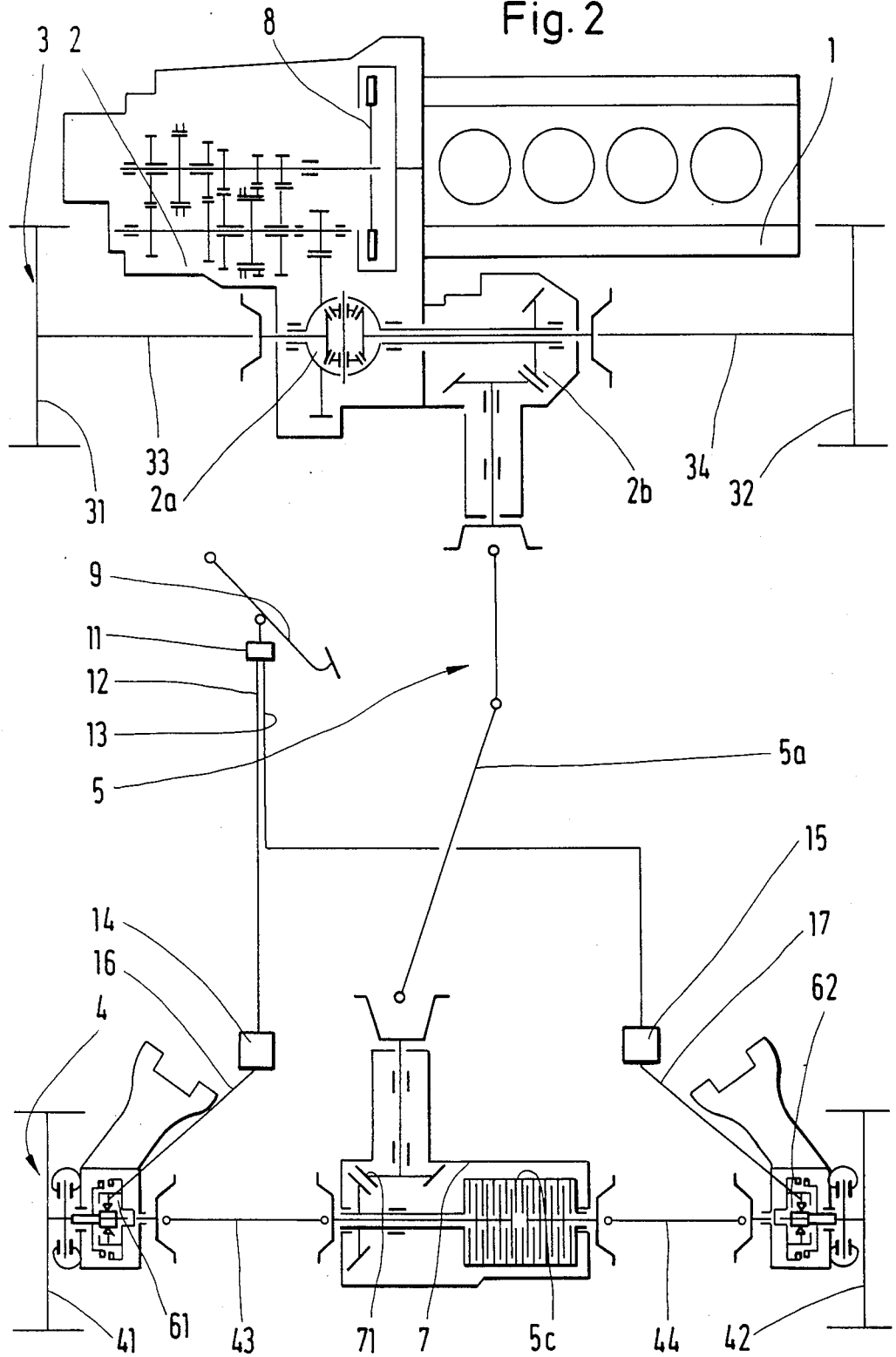
FIG. 2 is a view similar to FIG. 1, of a second embodiment.

The two FIGS. 1 and 2 show the drive arrangement of a motor vehicle with a front engine 1 and all-wheel drive wherein the wheels 31, 32 of the front axle 3 are continuously driven, while the drive for the wheels 41, 42 of the rear axle 4 is rendered automatic by means of a viscous coupling device 5b (FIG. 1) or 5c (FIG. 2) arranged in the driveshaft line 5 between the front axle and the rear axle, so that front and rear axles are continuously coupled together essentially rigidly with regard to torque.

A viscous coupling device consists of a drum-shaped housing, hermetically sealed toward the outside, in which two closely-spaced sets of steel disks are supported independent of one another. One set is connected via the housing of the viscous coupling device with the front axle 3, and the other set is mounted on a shaft running to the rear axle. Between the two sets of disks there is a viscous silicone oil which is capable of transmitting high shearing forces. Because of the particular properties of this oil, the required drive forces are transmitted at fairly high differential speeds.

The drive engine 1 with coupling 8 and connecting gear shift 2 is in each instance arranged at the front of the vehicle. The wheels 31, 32 of the front axle are continuously driven directly by way of a front-axle differential 2a and drive half-shafts 33, 34.

Driving of the wheels 41, 42 of the rear axle 4 is effected by way of a driveshaft line 5 coupled by means of an angle gear 2b to the engine/gear box 1, 2, a rear-axle gear 7 and drive half-shafts 43 and 44. Within the driveshaft line is the viscous coupling device, which in the example of FIG. 1 is arranged at the beginning of the rear-axle gear 7 and is labelled 5b. Such a viscous coupling device has the property of transmitting only low torques when only small differences in speed between its input and output shafts occur. However, it is capable of transmitting high torques as soon as somewhat greater differences in speed begin to occur between the input and output shafts. Only when the front wheels 31 and 32, which are continuously driven directly, turn with very little slippage because of particularly good road conditions, i.e., the rotational speed of the front and rear wheels is approximately equal, there is practically no torque transmitted to the viscous coupling device and the rear wheels therefore rotate freely. In all other road conditions a torque is transmitted to the rear axle through the viscous coupling device. The four wheels of the motor vehicle are thus in general driven permanently, while the ratio of the transmission of force to front and rear axles adjusts automatically according to the road conditions. Under such operating conditions an essentially rigid coupling thus prevails between the front and rear wheels, so that a locking of the front wheels by overbraking would therefore alternatively result in a corresponding locking of the rear axle by way of the driveshaft line 5 if no specific precautions were taken against this.

In the train of the driveshaft line 5 transmitting the torque between front axle 3 and rear axle 4 there is therefore provided a torque coupling and uncoupling arrangement which in the example of FIG. 1 is designed as free-wheel device 6 with a free-wheel lock, for example as grip roller free-wheeling device, arranged at the connection to the viscous coupling device 5b. It is understood that this free-wheeling device 6, may alternatively be arranged at the connection to the angle gear 2b, i.e., at the front end of the drive shaft 5a or else, as in the known Golf syncro automobile, behind the viscous coupling device 5b, that is, inside the rear axle gear 7.

In the example of FIG. 2, two free-wheeling devices 61, 62, each provided with a free-wheel lock arrangement, are arranged in the train of the driveshaft line leading from the rear-axle gear 7 to each of the rear wheels. In the example shown, the free-wheeling devices are arranged between the drive half-shafts 43, 44 and the wheel hubs of the rear wheels 41, 42. However, it is understood that they may alternatively be arranged, as in FIG. 2 of DE-OS No. 33 17 247, between the rear-axle gear 7 and the drive half-shafts 43, 44. In this example the viscous coupling device 5c is integrated into the rear-axle gear, which is designed after the fashion of a known torque splitter (EP-OS No. 38,309) that assumes the function, as it were, of both an automatically lockable center differential and automatically lockable rear-axle differential and permits only small differences in speed between the two wheels 41, 42.

The free-wheeling devices of the motor vehicle having front engine and all-wheel drive disclosed in DE-OS No. 33 17 247 are generally released in forward drive and are locked by the free-wheel lock—manually or else automatically upon engagement of reverse—only in reverse for the purpose of retaining all-wheel drive. On the other hand, the free-wheeling devices 6 or 61 and 62 in a vehicle according to the present invention having front engine and all-wheel drive are continuously locked by the free-wheel lock during drive operation in both forward and reverse directions. Only upon actuation of a lock control device such as the service brake, of which only the brake pedal 9 is illustrated, is the free-wheeling device automatically released by release of the free-wheel lock. For this purpose the brake pedal 9 is assigned a position indicator 11 which, upon actuation of the brake pedal 9, transmits, over a signal line 12, a signal to a hydraulic, pneumatic or electromagnetic or other actuating means 14, which in turn moves an actuating rod 16 in the free-wheeling device 6 to release the free-wheel lock.

In the example of FIG. 2 two signal lines 12, 13, two actuating means 14, 15 and two actuating rods 16, 17 are accordingly provided for the two free-wheeling devices 61, 62.

In normal drive operation, i.e., on accelerating, in constant drive and, alternatively, in retarding by reducing the supply of fuel (taking the foot off the gas), an all-wheel drive thus exists—as an element of the properties of the viscous-coupling device—in which accelerating or braking torques are transmitted to all drivable wheels of the motor vehicle. This means, among other things, that upon taking a corner, even when the vehicle is braked by taking the foot "off the gas," the all-wheel drive remains fully effective and, accordingly, lateral guiding forces and shearing forces are transmitted to all wheels of the vehicle. The roadworthiness of the vehicle remains completely unaltered.

Upon actuation of the brake pedal 9, on the other hand, the free-wheel lock of the free-wheeling devices 6 or 61 and 62 is released, so that its free-wheeling effect is activated. Since the free-wheeling devices are arranged and sized so that—in the unlocked and accordingly activated state—their free-wheel part coupled with the driven rear wheels 41, 42 is able to override their free-wheel part coupled with the front-axle drive, it is thereby ensured that the rear wheels are uncoupled from the front wheels when the front wheels are braked more heavily than the rear wheels. Any overbraking of the front wheels (locking) thus cannot act on the rear wheels through the driveshaft line 5.

In reverse drive, the free-wheeling devices 6 or 61 and 62 are at first locked, i.e., their free-wheel locks are not initially connected by the engagement of reverse; the usual all-wheel drive is thus at first likewise provided in reverse drive. When, in reverse drive, the brake pedal 9 is actuated, the free-wheel lock of the free-wheeling devices 6 or 61 and 62 is released. When at the same time the front wheels are overbraked, the rear wheels and the front wheels, because of the sizing and arrangement of the free-wheeling means, are again automatically coupled rigidly together. Thus in this case, as in all-wheel drive with engaged free-wheel lock, the part of their braking torque no longer capable of direct transmission by the front wheels is transmitted to the rear wheels and brought into action by loading of the latter in an emergency.

The invention has been explained by means of examples in which a viscous-coupling device is employed. However, it is not limited to such devices. In principle, it may be applied in all all-wheel drives in which a free-wheeling device is included in the driveshaft line leading from the front-axle drive to the drivable rear wheels there which is intended to prevent an overbraking of the front wheels from acting on the rear wheels.

I claim:

1. A motor vehicle comprising a front engine and an all-wheel drive arrangement wherein wheels of a front axle are driven continuously, while a drive for wheels of a rear axle is capable of being made automatic by means of a viscous coupling arranged in a driveshaft line between the front axle and the rear axle so that the front and rear axles are essentially rigidly coupled together with regard to torque, and at least one free-wheeling means with a free-wheel lock is provided in a train of the driveshaft line transmitting the torque between the front and rear wheels so that, in an unlocked state, a first part of said free-wheeling means is coupled with a rear-axle drive and is capable, in a forward drive function of the vehicle, of overriding a second part of said free-wheeling means coupled with a front-axle drive, and lock control means for actuating the free-wheel lock during drive operation and for releasing the free-wheel lock upon actuation of a service brake.

2. A motor vehicle having all-wheel drive as defined in claim 1, wherein said lock control means is a pneumatically operated means.

3. An all-wheel drive motor vehicle as defined in claim 1, wherein said lock control means is a hydraulically operated means.

4. An all-wheel drive motor vehicle as defined in claim 1, wherein said lock control means is an electrically operated means.

5. An all-wheel drive motor vehicle as defined in claim 1, wherein said lock control means includes a combination of electrical, pneumatic and hydraulic components.

6. An all-wheel drive motor vehicle, comprising:
a service brake;
a front mounted engine;
front wheels on a front axle;
a front-axle drive provided so as to continuously drive said front wheels;
rear wheels on a rear axle;
a rear-axle drive provided so as to drive said rear wheels;
a driveshaft line having a train and being provided between said front axle and said rear axle so as to transmit torque between said front and said rear wheels;
means for controlling said rear-axle drive of said rear wheels so that said front axle and said rear axle are essentially rigidly coupled together with regard to torque; and
at least one free-wheeling means including a free-wheel lock, a first free-wheel part coupled with the rear-axle drive, and a second free-wheel part coupled with said front-axle drive, said free-wheeling means being provided in said train of said driveshaft line so that in an unlocked state said first free-wheel part is capable, in a forward drive operation of the vehicle, of overriding said second free-wheel part, and lock control means for causing the free-wheel lock to be locked during a drive operation of the vehicle and released upon actuation of said service brake.

7. An all-wheel drive motor vehicle as defined in claim 6, wherein said controlling means includes a viscous coupling provided so as to automatically engage said rear-axle drive.

8. An all-wheel drive motor vehicle as defined in claim 6, wherein said free-wheeling means is a grip roller free-wheeling means.

9. An all-wheel drive motor vehicle as defined in claim 6, wherein said lock control means is a pneumatically operated means.

10. An all-wheel drive motor vehicle as defined in claim 6, wherein said lock control means is a hydraulically operated means.

11. An all-wheel drive motor vehicle as defined in claim 6, wherein said lock control means is an electrically operated means.

12. An all-wheel drive motor vehicle as defined in claim 6, wherein said lock control means includes a combination of electrical, pneumatic and hydraulic components.

* * * * *